US008707352B1

(12) United States Patent
Crespo et al.

(10) Patent No.: US 8,707,352 B1
(45) Date of Patent: Apr. 22, 2014

(54) SYSTEMS AND METHODS FOR CREATING AN ANIMATION SEQUENCE REPRESENTATIVE OF A MODELED CONDITION

(75) Inventors: Alberto Javier Crespo, Roswell, GA (US); Kelly Collins Pollak, Sharpsburg, GA (US)

(73) Assignee: The Weather Channel, Inc., Atlanta, GA (US)

( * ) Notice: Subject to any disclaimer, the term of this patent is extended or adjusted under 35 U.S.C. 154(b) by 527 days.

(21) Appl. No.: 12/578,678

(22) Filed: Oct. 14, 2009

(51) Int. Cl.
H04N 7/10 (2006.01)
H04N 7/025 (2006.01)

(52) U.S. Cl.
USPC ............. 725/35; 725/32; 725/33; 725/34

(58) Field of Classification Search
None
See application file for complete search history.

(56) References Cited

U.S. PATENT DOCUMENTS 6,496,780 B1 * 12/2002 Harris et al. .............. 702/3
7,146,095 B2 * 12/2006 Asami ....................... 386/200
7,313,810 B1 * 12/2007 Bell et al. ................. 725/116

\* cited by examiner

Primary Examiner — Nathan Flynn
Assistant Examiner — Omar S Parra
(74) Attorney, Agent, or Firm — Meunier Carlin & Curfman, LLC

(57) ABSTRACT

Methods and systems for providing a local content to a viewer in the form of an animation sequence. A micro program may be data-cast to a receiver to provide national and local content to a number of receiver units that may be located at, e.g., a cable headend or other distribution point. The micro program executes, at least in part, on each receiver unit. If the micro program is relevant to the receiver unit, then the micro program executes to completion. The micro program may include a code representative of local conditions that is mapped by the local receiver unit to a library of animation graphics used to create an animation sequence to convey the local conditions to a viewer. For example, the local conditions may be weather conditions and the animation sequence conveys how the weather will feel or affect a viewer.

18 Claims, 17 Drawing Sheets

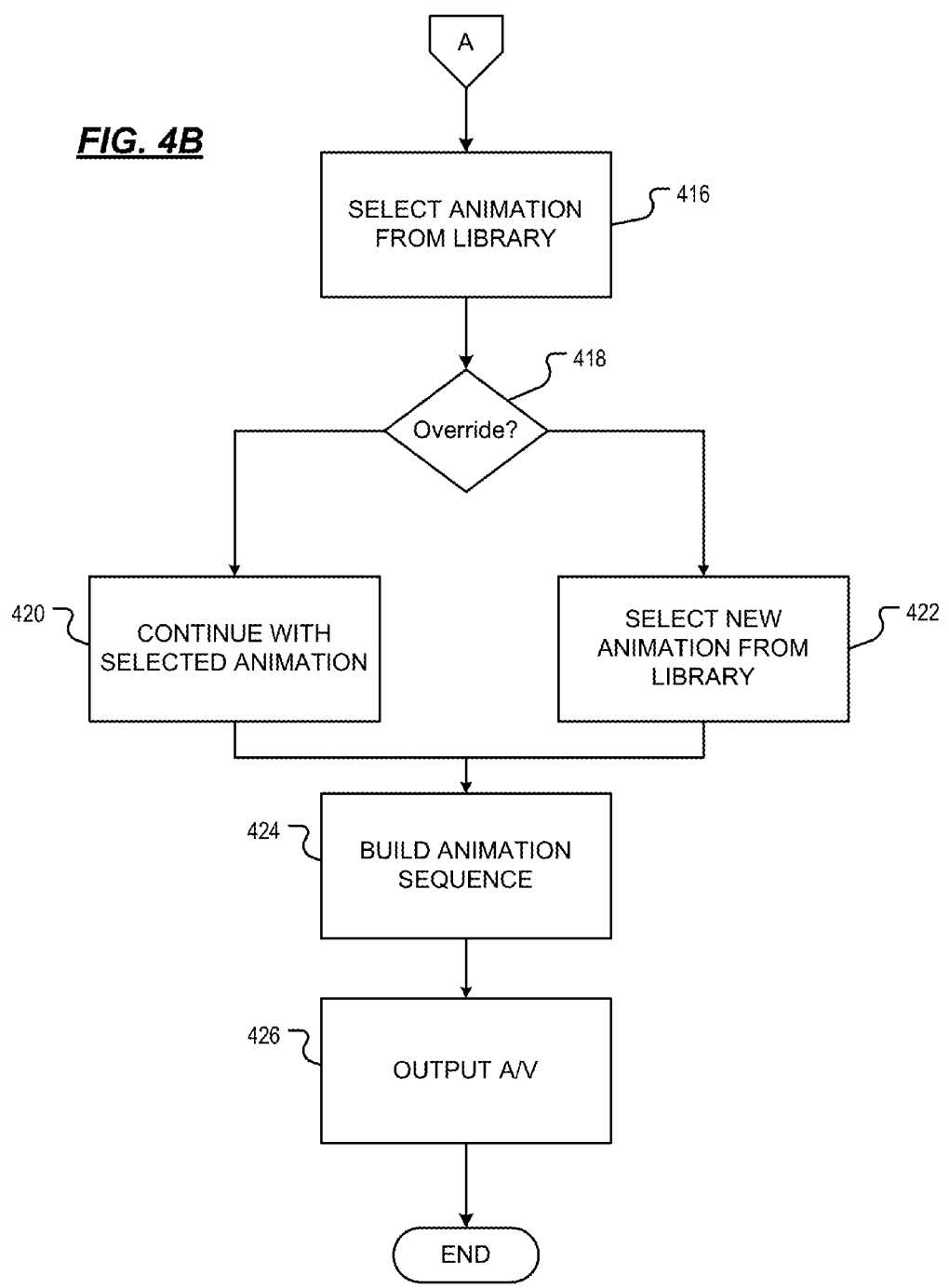

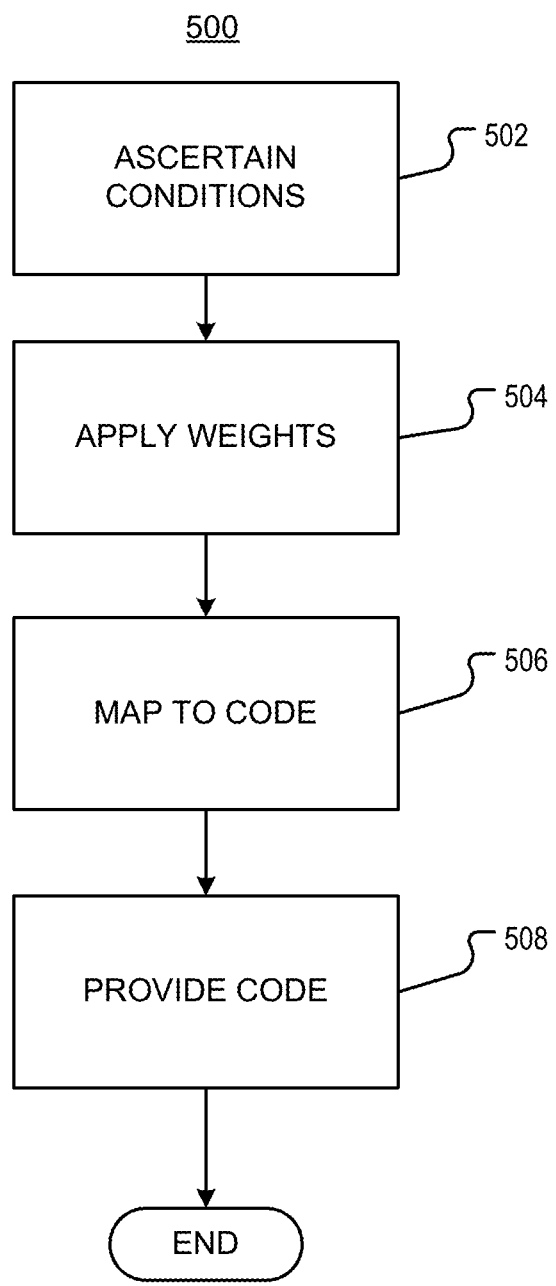

Sunny, Cold and Chance of Rain

Sunny, Hot, Windy and Chance of Rain

Rainy, Cool and Windy

Cloudy, Cool and Chance of Rain

Snowy

Thunderstorms and Mild

Foggy

SYSTEMS AND METHODS FOR CREATING AN ANIMATION SEQUENCE REPRESENTATIVE OF A MODELED CONDITION

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright© 2009, The Weather Channel, All Rights Reserved.

BACKGROUND

Various systems distribute and display local content via cable television. For example, television programming providing user-relevant information presently exists in the form of national video and local information tailored for the geographical location of a local television system. Examples of local programming include, among other things, local weather programming, concert listings, theatre event listings, sports event listings and scores, traffic and advertising. In particular, weather information may be distributed to cable systems that is tailored for a particular region, city/state, ZIP code, etc.

However, much of the localized content is provided as observations, data points, measurements, or other meteorological data. For example, aspects of local weather are provided in radar maps, high and low temperatures, humidity levels, weather condition icons (e.g., sunny, cloudy, partly cloudy, partly sunny, etc.), wind speeds, textual alerts, and likelihood of precipitation that visually present factual information about the weather. While informative, this information alone does not convey how the weather will feel or affect the viewer. In other words, the viewer, after reviewing the local weather information must then determine if he or she will need a jacket or heavier coat, an umbrella or other accessory. Often, when a viewer is still unsure, he or she will just step outside to determine how the weather feels or will affect his or her day.

SUMMARY

Methods and systems for providing a local content to a viewer. A micro program may be data-cast to a receiver to provide national and local content to a number of receiver units that may be located at, e.g., a cable headend or other distribution point. The micro program executes, at least in part, on each receiver unit. If the micro program is relevant to the receiver unit, then the micro program executes to completion. The micro program may include a code representative of local conditions that may be used by the local receiver unit to create an animation sequence from a library of animation graphics. The animation sequence may be part of a media presentation used to convey the local conditions.

The foregoing is a summary and thus contains, by necessity, simplifications, generalizations, and omissions of detail. Those skilled in the art will appreciate that the summary is illustrative only and is not intended to be in any way limiting.

BRIEF DESCRIPTION OF THE DRAWINGS

FIGS. 4A-4B illustrate an example flow diagram of a process of the receipt and execution of the micro program.

FIG. 5 illustrates an example flow diagram of a process for determining a code representative of climatic conditions.

DETAILED DESCRIPTION

The present disclosure is directed to methods and apparatus for providing a local content to a viewer of, e.g., a cable broadcast system. Briefly described, a micro program may be used to provide national and local content using autonomous local control. A micro program is a small program that is data-cast by a central system to a number of receiver units that may be located at, e.g., a cable headend or other distribution point. The cable headend may be part of a distribution network that includes set-top devices to tune to specific channels to display content on a television. The micro program executes, at least in part, on each receiver unit. If the micro program is relevant to the receiver unit, then the micro program executes to completion. However, if the micro program is not relevant to the receiver unit, then the micro program terminates itself. The micro program determines whether it is relevant to the receiver unit by comparing a local value associated with the receiver unit with a local value specified in the micro program. The local values associated with the receiver unit may correspond to a local condition, such as the subset of the population served by the receiver unit.

In some implementations described in more detail below, the micro program may specify that the local receiver unit is to create an animation sequence from a library of animation graphics to generate a media presentation that conveys to a viewer "what the weather feels like" or "how the weather will affect the viewer." This is in contrast to conventional graphics that convey factual information about the weather (e.g., Doppler radar, sky condition icons, high/low temperatures, wind speed, etc.). The animation sequence may be displayed as part of the national or local content provided to the viewer by a content provider over a distribution network.

Distribution Network

Figure 1:
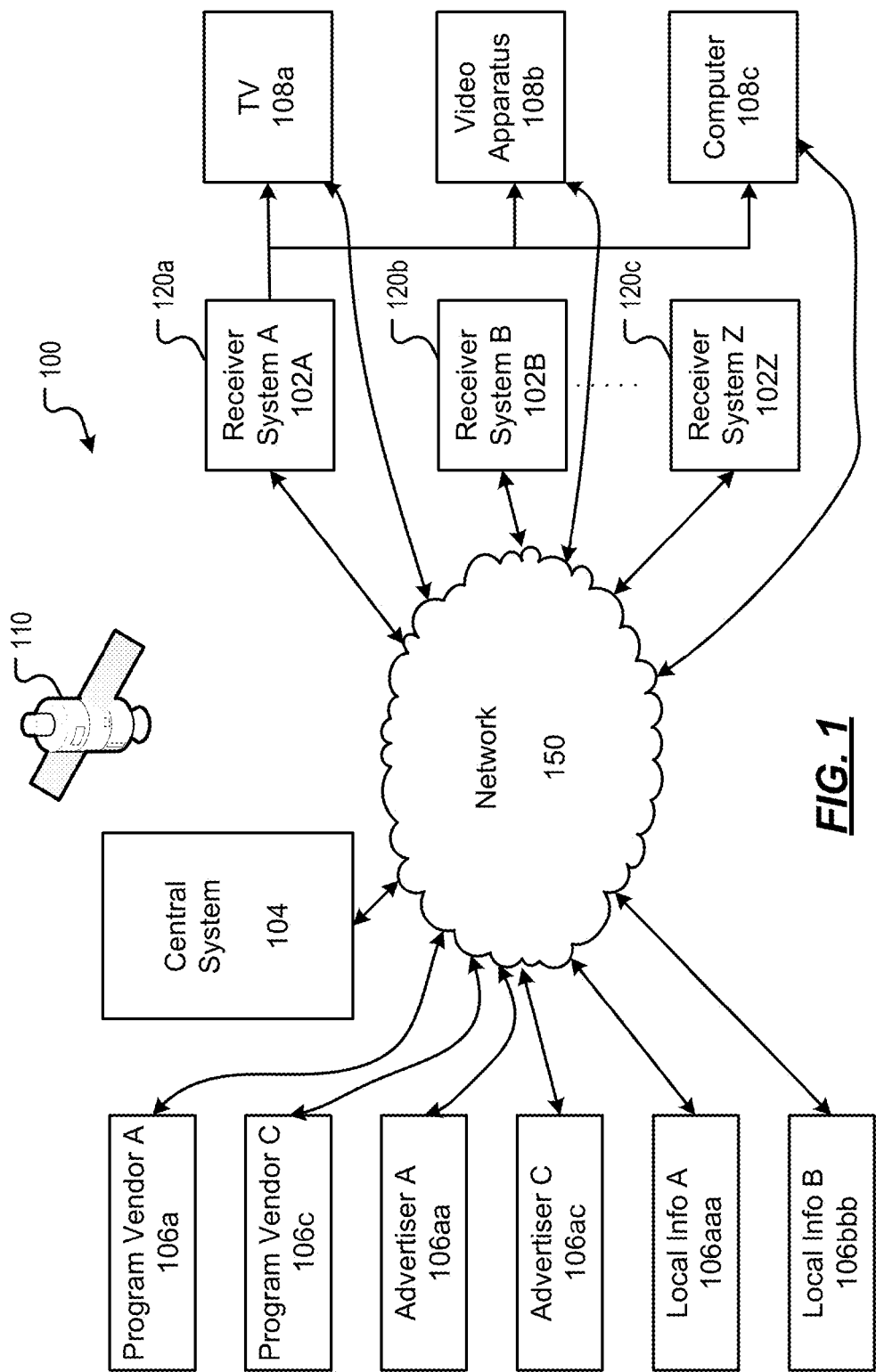
FIG. 1 is a block diagram of an exemplary distribution network in which the present invention is used.

Referring to FIG. 1, receiver units, collectively designated as 120, are used in a distribution network 100. The central system 104 receives product, content, information and other material from which visual, audiovisual, multimedia or other display or presentations or material of any sort ("programming") can be prepared by central system 104. The programming may be in the form of television or multimedia programming, online presentations, computer presentable or executable information, messaging, streaming video or audio or both, multimedia presentations, or any other material to which users desire access. The vendors are collectively designated as 106, and display devices, which can be used by users who desire access to the programming, are designated by the numeral 108. The vendors 106 include, among others, providers of television programs, movies, music, and graphics, information providers, such as weather information providers, newscasters, financial information providers, sports casters, and advertisers. In addition, the vendors 106 can include those who provide local content, which is of interest to a subset of the general population. In one implementation, the subset is identified on a geographical basis. However, the subset can be based on any desired traits.

In the context of providing weather information according to this disclosed, non-limiting implementation of the invention, the central system 104 receives weather data from weather information providers, such as the National Weather Service, and formulates and produces national and local weather programs, which it delivers to a plurality of receiver systems, collectively designated as 120. FIG. 1 shows a satellite transponder 110 for delivery of programs from the central system 104 to the receiver systems 120. However, as those skilled in the art will appreciate, any distribution network capable of delivering information from a system such as the central system 104 to receiver units 102 can be used in the place of the transponder 110. Currently, examples of distribution networks that may supplant the transponder 110 include, among others, terrestrial wireless/wire line/hybrid networks and infrastructure.

FIG. 1 shows the receiver units 120 being employed in the receiver systems 102, which are illustrated as being separate from the display devices 108, such as at the head end of a cable television system, for example. However, those skilled in the art will understand that a receiver unit can be employed in or near a display device of a user, such as for example a set top box. That is, for example, the central unit 104 can directly provide programming to a display device of a user, via for example, broadband technology, such as digital subscriber line ("DSL"), satellite transponder, a cable connection, or as otherwise desired.

Display devices 108 (which may include a set top box or other functionality for communicating upstream as well as allowing the user control over access to programming from central system 104), receiver units 120, vendors 106, central source or system or systems 104, or any combination of them, may be interconnected via a communications network 150 in order, among other things, to provide for any desired communications and/or distribution of content or programming from any entity on the network as desired to any other such entity, and vice versa. One non-limiting example is the implementation of interactive television, in which each of a number of receiver units 120 can receive national content and local content from central system 104, store such content, and at the appropriate time and/or upon appropriate command, prepare and deliver to display devices 108 programming desired or requested by one or more users.

The users can, via the network 150, communicate with any or all of receiver units 120, central system 104, or vendors 106 to obtain delivery of programming, shipment of products or other products or services, using their display devices 108 to request them. Such interaction may be real time, delayed or as otherwise desired. Programming, content, or components of them may be stored and generated at any or all of, or across any or all, of display devices 108, receiver units 120, central system 104, vendors 106, or any other appropriate capacity on networks 150 or system 100.

Receiver Unit

The central system distributes programming, as well as commands and other information to the receiver units. The programming is typically in the form of audio/video ("A/V") information. As used herein A/V information includes digital, as well as analog formats, such as the Motion Pictures Expert Group ("MPEG") standard, in particular the MPEG-2 standard, the National Television System Committee ("NTSC") standard, the Advanced Television Systems Committee ("ATSC") and the Phase Alternate Line ("PAL") standard.

Figure 2:
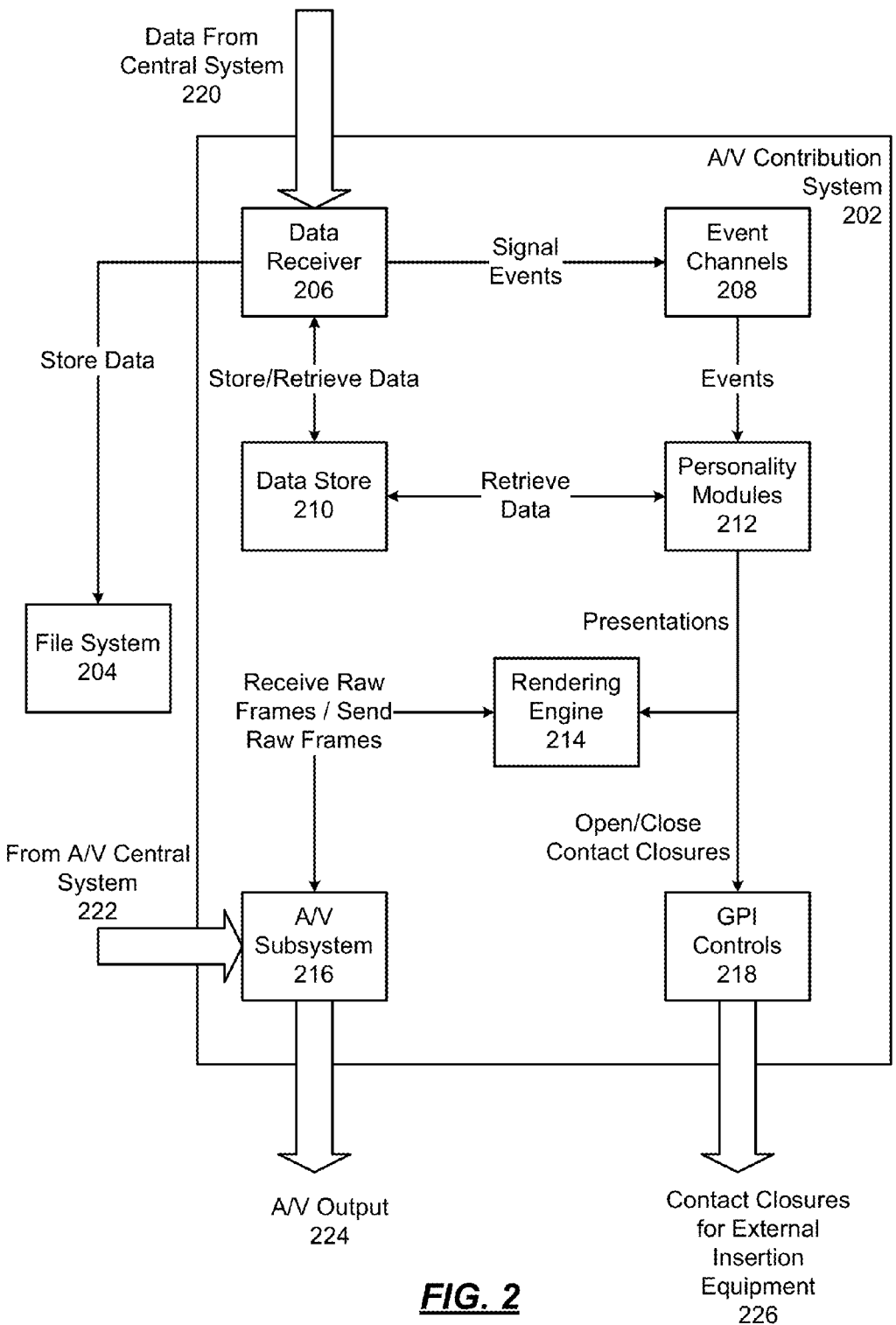
FIG. 2 is a block diagram of a portion of an exemplary receiver unit in accordance with an implementation of the invention.

FIG. 2 shows the A/V Contribution System 202 and the File System 204 of the receiver unit. Although the receiver unit includes other elements and systems, only the A/V Contribution System and the File System are shown in FIG. 2 for simplicity. The A/V Contribution System includes a data receiver 206, a number of event channels, referred to collectively as 208, a data store 210, a number of personality modules, referred to collectively as 212, a rendering engine 214, an A/V subsystem 216, and General Purpose Interface ("GPI") controls 218. The A/V Contribution System receives programming from the central system at input 222 and commands and other communications at input 220.

The central system communicates with the receiver units by generating messages, translating the messages into packets and transmitting the packets to the receiver units. The data receiver 206 receives the packets on input 220 and translates the packets back into messages to detect any high priority messages and perform error correction. Various types of messages are supported, including file transfer messages and micro program messages. A type field within the message specifies the type of message. As will be apparent to those skilled in the art, additional types of messages can be supported by defining additional type fields.

The data receiver examines the type field for each message and processes the message accordingly. If the message is a file transfer message, then the data receiver receives and stores the file in the file system 204. For example, a video file can be stored in the file system.

If the message is a micro program message then the micro program begins to execute on the receiver unit. A micro program is a small program that can include native binary executables, scripts, bytecode such as java bytecode, or source code. If the micro program includes source code, then the data receiver translates the source code into an executable form. The micro program can perform any type of action typically performed by a computer, including performing computations and calculations, retrieving and storing data, and communicating with other subsystems and devices. Micro programs provide the central system with a flexible and extensible control interface to the A/V Contribution System because the central system is not limited to a set of predefined commands.

The data receiver can store data to and retrieve data from the data store 210. The data store includes local values for the receiver unit. The local values correspond to the subsets served by the receiver unit and are used to provide local content. In one implementation, the local values correspond to local weather conditions, such as a local temperature. A local value is typically not unique to a receiver unit, i.e., different receiver units can have the same local value. However, a local value, such as an identifier, can be unique to a receiver unit. In one implementation, the local values are updated by a micro program. Alternatively, a file transfer message can be used to update the local values.

The event channels 208 provide the data receiver 206 with a flexible way to interface with the personality modules 212. In one implementation, the event channels are implemented using the CORBA COS Event Channel interface. The data receiver sends an event signal to the event channels, which in turn notify the personality modules of the event. The data receiver does not need to determine which personality modules should receive the event notification.

The personality modules 212 provide presentations to the rendering engine 214 in response to an event notification. A presentation controls how the rendering engine modifies the A/V from the central system to provide a combination of national and local content. Different receiver units can have different personality modules so that the presentation of local content can be customized for each receiver unit. For example, different personality modules can be associated with different broadcast companies so that the local content and/or the presentation of the local content is different for different broadcast companies.

The personality modules also provide GPI controls 218, which are used to control A/V insertion equipment (not shown). The GPI controls 218 control contact closures that allow the A/V insertion equipment to override the A/V outputs of the A/V Contribution System.

The rendering engine 214 receives video frames from the A/V subsystem 216 and returns rendered video frames to the A/V subsystem. In one implementation, the rendering engine is implemented using an off the shelf graphics card or chip, such as an open graphics library ("Open GL") or DirectX video chip.

The A/V subsystem 216 receives A/V information 222 from the central system and provides raw video frames to the rendering engine 214. The A/V subsystem receives rendered video frames from the rendering engine and outputs the rendered video frames as part of the A/V output 224. Although not shown in FIG. 2, the A/V subsystem can also receive A/V information from the file system 204. For example, a movie, animation graphics or images stored in the file system can be sent to the A/V subsystem. The rendering engine instructs the A/V subsystem to switch inputs so that the movie, animation graphics or images are processed by the A/V subsystem rather than the A/V information from the central system. Additional details of the A/V subsystem are shown in FIG. 3.

Figure 3:
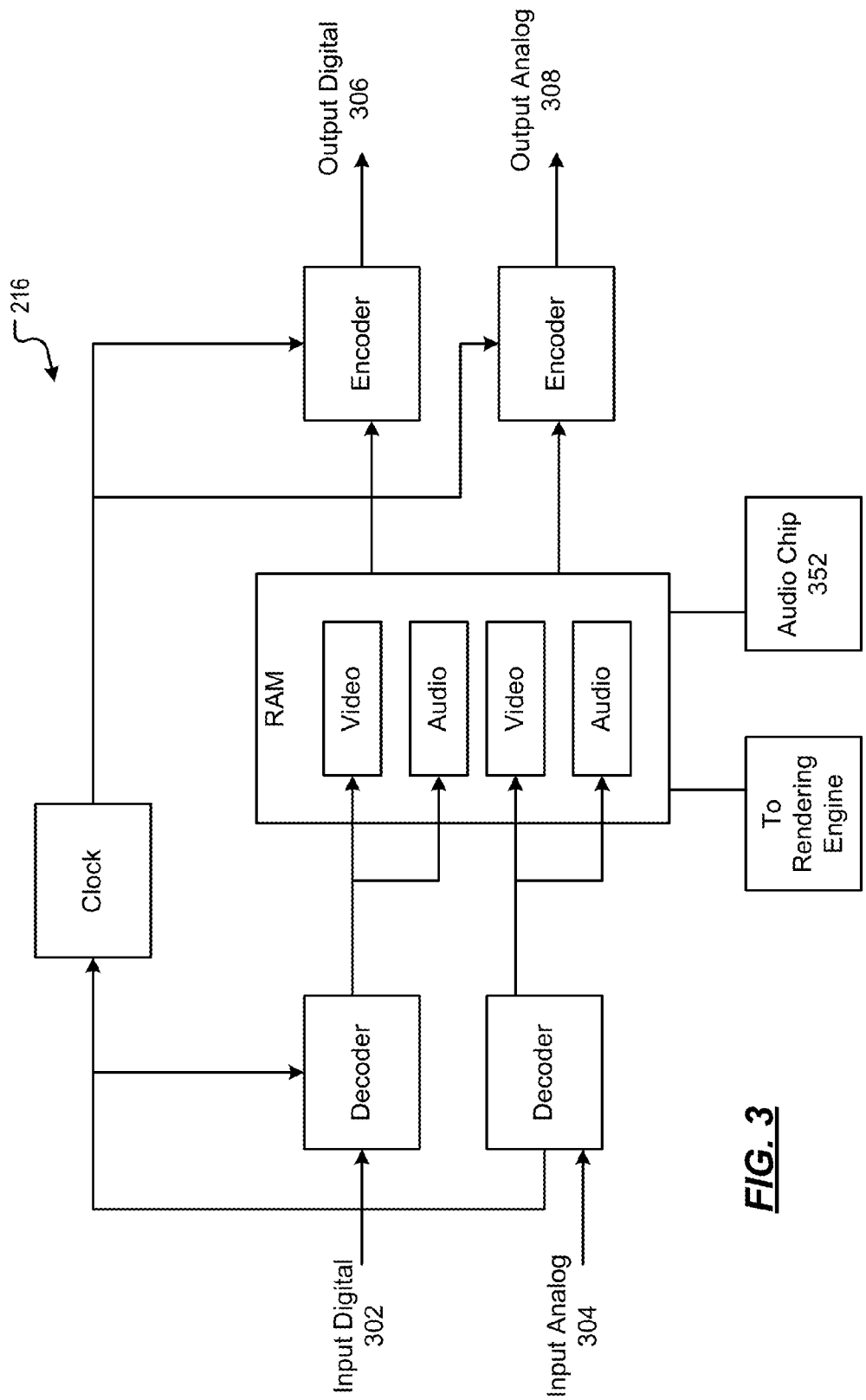
FIG. 3 is a block diagram of an exemplary A/V subsystem in accordance with an implementation of the invention.

As shown in FIG. 3, the A/V information received from the central system can include both digital 302 and analog information 304. The A/V subsystem can output rendered video frames using either a digital output 306 or analog output 308. In one implementation, an audio chip 352 is included in the A/V subsystem. The audio chip processes the input audio to create output audio. Although the audio chip is shown as part of the A/V subsystem in FIG. 3, the audio chip can be separate from the A/V subsystem.

Micro Program Execution

Each micro program is distributed by the central system via a universal data-cast method, which is the central system sends each micro program to every receiver unit served by the central system. Each micro program executes, at least in part, on every receiver unit. However, the micro program terminates itself if the micro program determines that it is not relevant to a receiver unit. Typically, a micro program compares a local value associated with the receiver unit with a local value specified by the micro program to determine whether the micro program is relevant. The micro program can specify that the local value associated with the receiver match, be within a range, be greater than or less than the local value specified by the micro program.

For example, a micro program that includes a command to create local content describing wind chill is relevant only to receiver units that serve areas with current or expected temperatures at or below 35° F. because the wind chill formula is only valid for these temperatures. Therefore, the micro program terminates itself on those receiver units having associated local temperatures above 35° F. The central system does not have to determine the relevant receiver units, i.e., which receiver units serve areas with current or expected temperatures at or below 35° F. The central system merely data-casts the micro program message and the determination is made by the micro program at each receiver unit.

If the micro program is relevant and commands the generation of local content, then the data receiver sends an event signal to the personality modules via the event channels. Upon receipt of the event notification, the personality modules provide the appropriate presentation to the rendering engine. The personality modules also access the data store and/or the file system to obtain data and/or information needed to provide the presentation.

The presentation can be provided by the micro program. Alternatively, if a presentation is used repeatedly, then the presentation can be stored in a personality module. In one implementation, a presentation for a local weather outlook that is used repeatedly is stored in a personality module. If the presentation for the local weather outlook needs to be modified, then a micro program may be distributed from the central system to replace the existing presentation with a new presentation.

Figure 4A:
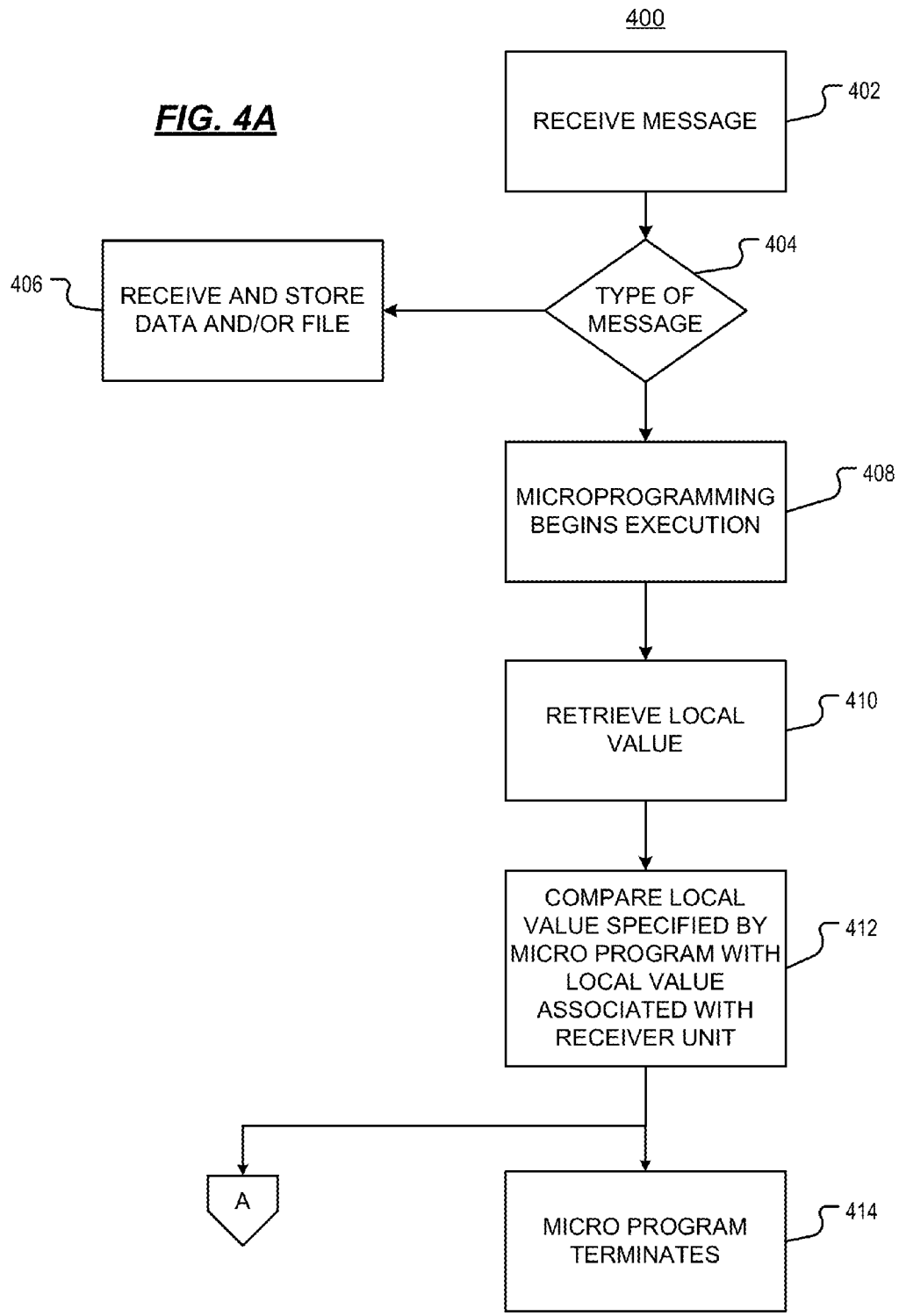

FIGS. 4A-4B illustrate an example flow diagram of a process 400 of the receipt and execution of the micro program. The process 400 may augment or replace graphics with an animation sequence to convey what a condition means to the viewer. In some implementations, the animation sequence is generated to convey, "what the weather means to the viewer" or "how the weather will affect the viewer," as described below and shown in FIGS. 6-12.

At 402, the data receiver receives a data-cast message. The data-cast may be received with a national program feed or separately from the central system 104. The receiver unit determines the type of message at 404. If the message is a file transfer message, then the file transfer path is followed to 406 and the data and/or file associated with the file transfer message is stored at the receiver unit. If, at 404, the message is a micro program message, then the micro program path is followed to 408, and the micro program begins executing.

At step 410, the micro program retrieves a corresponding local value associated with the receiver unit and, at 412; the micro program compares a local value specified by the micro program with the local value associated with the receiver unit. Local values in the micro program may include local information, such as local temperature or local time, or a local configuration, such as files stored on the receiver unit. The local values may also include a code that is representative of weather conditions (e.g., sunny and cold, cloudy and windy, snow and ice, etc.). Additional details of the code are described with reference to FIG. 5.

If the local value indicates that the micro program is not relevant to the receiver unit, then the micro program terminates itself at step 414. However, if the local value indicates that the micro program is relevant to the receiver unit, then the micro program continues executing at 416 (FIG. 4B), where the code that accompanied the micro program may be mapped to one or more animation graphics.

At 418, it is determined if the code is to be overridden. For example, receiver system 102 may be configured to override specified codes representative of certain conditions. At 420, if an override is not specified, then process continues by selecting the mapped animation graphics from a library of animations that may be stored in the data store 210. For example, the code may be representative of sunny conditions. As such, a series of animation graphics that depict "what does sunny weather feel like or affect a viewer" may be selected from the library.

However, if at 418 an override is specified, then at 422, an alternate set of animation graphics specified by the override may be selected from the library. For example, in some implementations, an override may specify that a code representative of "windy conditions," is to be locally displayed as an animation that represents "what windy and cold conditions mean into the viewer" when the temperature is below a predetermined threshold value. This override may instruct the local receiver 102 to retrieve animation graphics that will convey to the viewer that the weather may feel cold in view of wind chill facts.

At 424, an animation sequence is built from the animation graphics retrieved from the library. For example, the rendering engine 214 may receive the retrieved animation graphics from the data store 210, and render video frames that are passed to the A/V subsystem 216. In some implementations, the animation graphics may be reusable images or sub-sequences that may be arranged or sequenced to create a complete animation sequence. In some implementations, the animation graphics may be complete animation sequences stored in the data store 210. The animation sequence may have a predetermined length specified by the micro program, a configuration file, a playlist, etc. For example, the animation sequence may be three seconds in length. The retrieving and/or building of the animation sequence may be performed for weather conditions at a local or national level, in accordance with the local values communicated with the micro program and the configuration of the receiver.

At 426, the animation sequence is output as an A/V output. The receiver may output digital and/or analog audio multimedia content (from A/V output 224) to end devices such as the television 108a, video apparatus 108b and/or computer 108c. The A/V output may be in any suitable format (e.g., MPEG, Flash, animated GIF, etc.) for presentation on the end devices 108a-c.

In some implementations, the library of animation graphics stored in the data store 210 may be periodically updated through a micro program directed to the receiver units. For example, the animation graphics may be updated in view of changing seasons, holidays, advertising campaigns, sporting events, local events, time-of-day, etc. Multiple versions of the animation graphics may be stored in the data store 210. For example, day and night versions of the animation graphics may be stored such that an animation sequence may be created having the appropriate time of day characteristics.

In some implementations, the animation sequence may be generated to promote safety. For example, in conditions where thunderstorms exist, the sequence will be generated such that an extended umbrella is not shown. In another example, where snow and ice exist, a car may be shown driving very slowly. Other safety messages may be conveyed in view of the local conditions.

In some implementations, the A/V output may include multimedia content that is accessible over a network, such as the Internet. A viewer may enter an appropriate uniform resource locator (URL), such as http://www.weather.com, in a web browser to access the multimedia content. The multimedia content may be provided as downloadable file or streaming content to the web browser using appropriate protocols and playback applications.

In some implementations, the animation graphics may include graphical images, photographs of people, places and/or things, video clips, still images, etc. Audio may accompany the animation graphics (e.g., wind noise may accompany images of wind).

FIG. 5 illustrates an example flow diagram of a process 500 for determining the code representative of weather conditions. The process 500 may be performed at the central system 104, or elsewhere, and communicated over the communication network 150 to the receiver systems 102.

At 502, weather conditions for a location are determined. The location may be a country, geographic region, a city/state, ZIP code, or other defined area to which the climactic conditions pertain. The weather conditions may include, community, dew point, temperature, wind, pressure, sky condition (e.g., cloudy, etc.), percent chance of precipitation, historical climatology data, and locality information. The weather conditions may be determined through observations and forecasting methodologies. The locality information may take into account conditions such as "what feels cold to a person in Florida may not feel cold to a person in Pennsylvania."

At 504, weights are applied to each of the weather conditions. The determination of the weighting may be performed based on the statistical relevance of each of the conditions. In some implementations, a relatively higher weight may be applied to temperature, dew point, humidity, percent chance of precipitation, and sky conditions, whereas a relatively lower weight may be applied to other weather conditions. In some implementations, a subset of climactic conditions may be used. For example, in some locations, it may be that changes in certain ones of the climactic conditions may have little or no statistical effect on the prediction of weather; therefore, these weather conditions can be ignored.

At 506, the weights of the weather conditions are aggregated and mapped to the code. There may be many codes indicative of various weather conditions. For example, there may be a code representative of each of the following non-limiting conditions as shown in Table 1, below:

TABLE 1

| Condition | Additional Condition | Additional Condition |
|---|---|---|
| Sunny | | |
| Sunny | Cold | |
| Sunny | Cold | Chance of Rain |
| Sunny | Cold | Windy |
| Sunny | Cold | Chance of Rain and Windy |
| Sunny | Cool | |
| Sunny | Cool | Chance of Rain |
| Sunny | Cool | Windy |
| Sunny | Cool | Chance of Rain and Windy |
| Sunny | Hot | |
| Sunny | Hot | Chance of Rain |
| Sunny | Hot | Windy |
| Sunny | Hot | Chance of Rain and Windy |
| Sunny | Mild | |
| Sunny | Mild | Chance of Rain |
| Sunny | Mild | Windy |
| Sunny | Mild | Chance of Rain and Windy |
| Rainy | | |
| Rainy | Hot | |
| Rainy | Hot | Windy |
| Rainy | Mild | |
| Rainy | Mild | Windy |
| Rainy | Cold | |
| Rainy | Cold | Windy |
| Rainy | Cool | |
| Rainy | Cool | Windy |
| Cloudy | | |
| Cloudy | Cool | |
| Cloudy | Cool | Chance of Rain |
| Cloudy | Cool | Windy |
| Cloudy | Cool | Chance of Rain and Windy |
| Cloudy | Cold | |
| Cloudy | Cold | Chance of Rain |
| Cloudy | Cold | Windy |
| Cloudy | Cold | Chance of Rain and Windy |
| Cloudy | Hot | |
| Cloudy | Hot | Chance of Rain |
| Cloudy | Hot | Windy |
| Cloudy | Hot | Chance of Rain and Windy |
| Cloudy | Mild | |
| Cloudy | Mild | Chance of Rain |
| Cloudy | Mild | Windy |
| Cloudy | Mild | Chance of Rain and Windy |

TABLE 1-continued

| Condition | Additional Condition | Additional Condition |
| --- | --- | --- |
| Snowy | | |
| Snowy | Icy | |
| Snowy | Windy | |
| Icy | | |
| Icy | Windy | |
| Thunderstorms | | |
| Thunderstorms | Mild | |
| Thunderstorms | Cool | |
| Thunderstorms | Cold | |
| Thunderstorms | Windy | |
| Thunderstorms | Snow | |
| Foggy | | |

One of ordinary skill in the art would recognize that the aforementioned list of conditions is merely exemplary, as many climactic conditions and combinations of weather conditions are possible.

At 508, the code is provided to the central system. The code may be placed into the data-cast from the central system 104 at predetermined times or as-necessary if conditions are rapidly changing.

Example Animation Sequences

FIGS. 6-12 illustrate several example, non-limiting animation sequences. Each sequence shows a representative number of still images to convey that the images are arranged in a sequence to provide the animation sequence. For example, FIGS. 6-11 illustrate four images, whereas FIG. 12 illustrates two. It is noted that any number of images or video clips may be sequenced to create the animation sequence in accordance with the processes described herein.

Figure 6A:
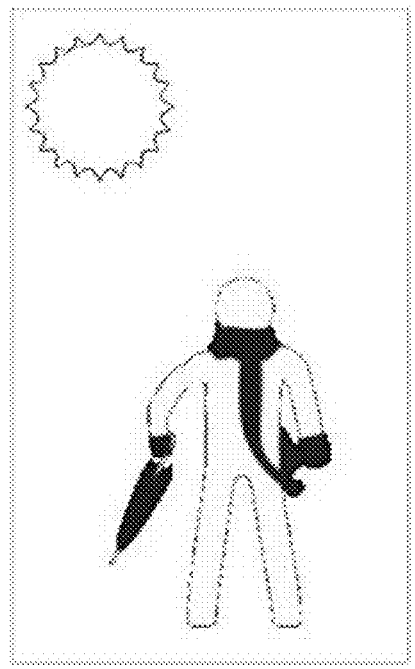
FIGS. 6-12 illustrate several example animation sequences.
Figure 6B:
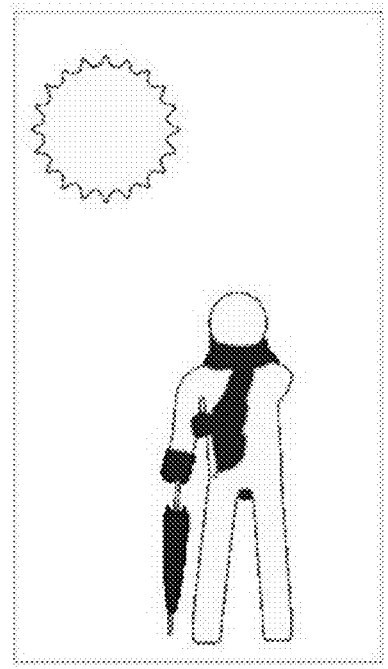
Figure 6C:
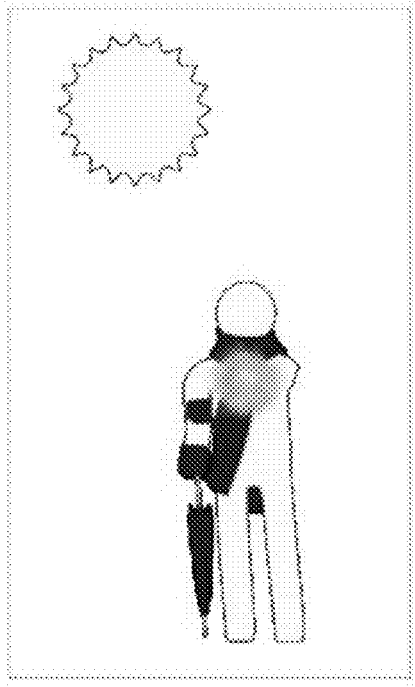
Figure 6D:
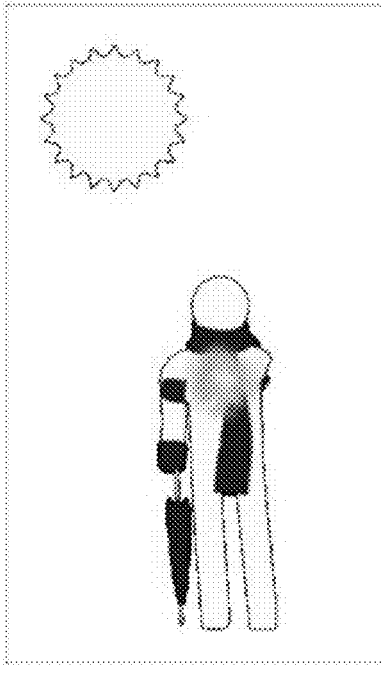

Referring to FIGS. 6A-6D, there is illustrated an animation sequence to convey what sunny, cold and a chance of rain feels like to a viewer. The sequence begins with an image of a person wearing a scarf that is blowing in the wind (FIG. 6A). The sequence continues by showing the person moving an arm over the upper torso area in a grabbing motion to convey that it is cold (FIG. 6B). Next, fog is shown as the person exhales (FIG. 6C). Lastly, the scarf continues to blow from left to right (FIG. 6D). As such, the animation sequence of FIGS. 6A-6D illustrates that the viewer will feel cold in the elements and should bring an umbrella because of the chance of rain.

Figure 7A:
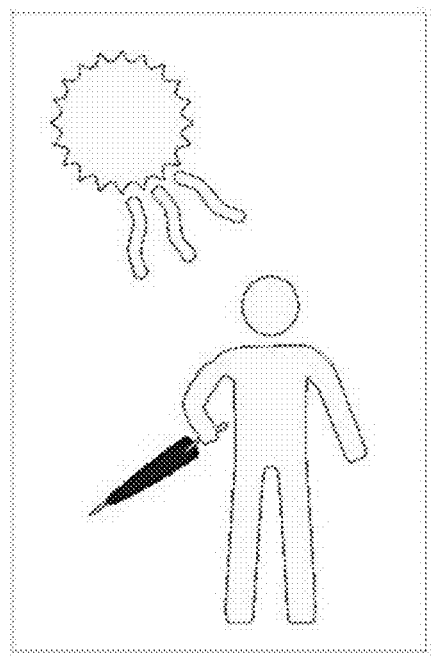
Figure 7B:
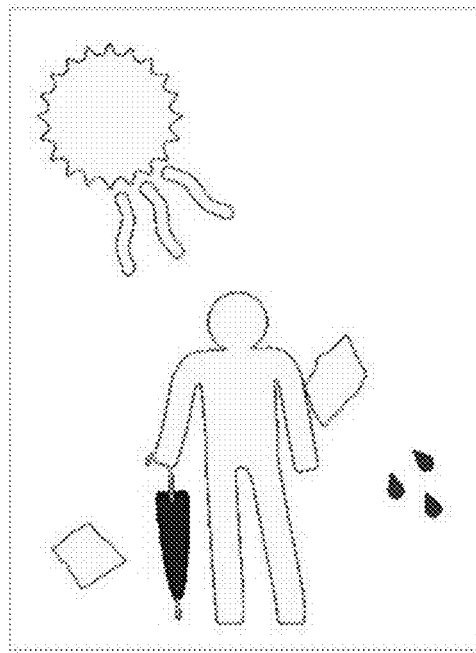
Figure 7C:
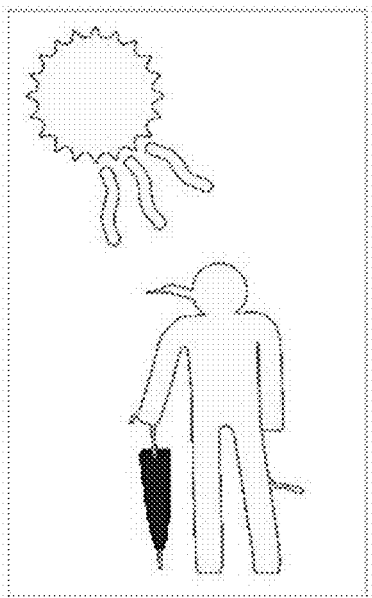
Figure 7D:
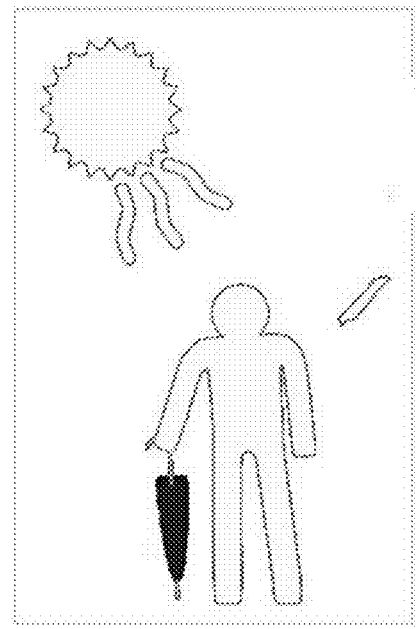

Referring to FIGS. 7A-7D, there is illustrated an animation sequence to convey what sunny, hot, windy and a chance of rain feels like to a viewer. The sequence begins with an image of a person holding an umbrella and a bright sun (FIG. 7A). The sequence continues by showing sweat blowing from the person, as well as papers swirling in the wind (FIG. 7B). Next, the papers continue to swirl around the person (FIG. 7C). Finally, the papers blow from the scene to the right (FIG. 7D). As such, the animation sequence of FIGS. 7A-7D illustrates that the viewer will feel hot in the elements and should bring an umbrella because of the chance of rain.

Figure 8A:
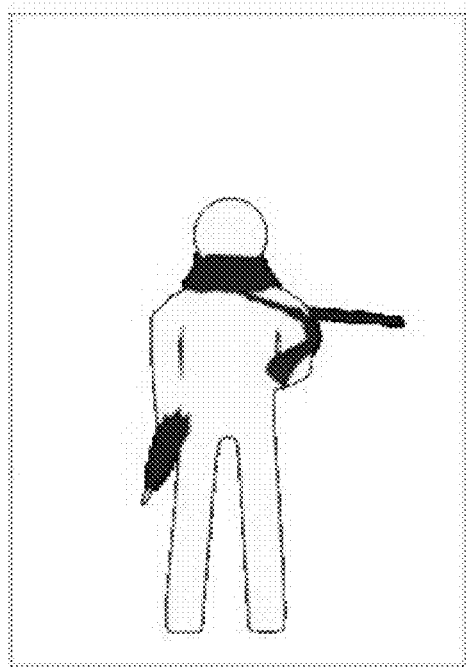
Figure 8B:
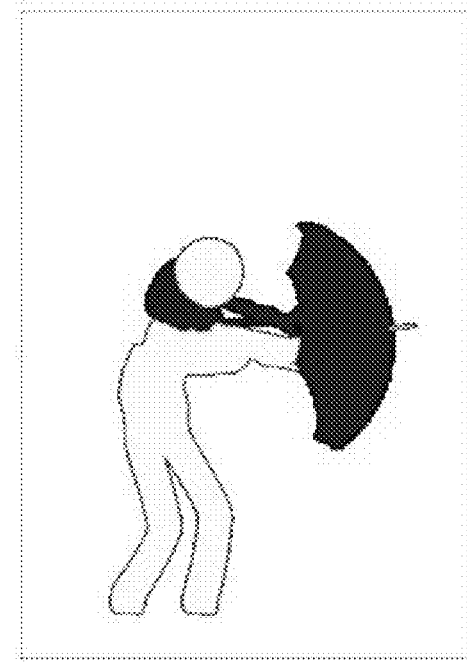
Figure 8C:
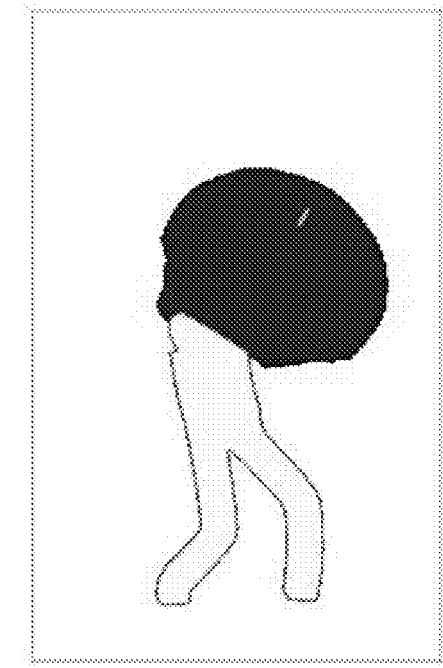
Figure 8D:
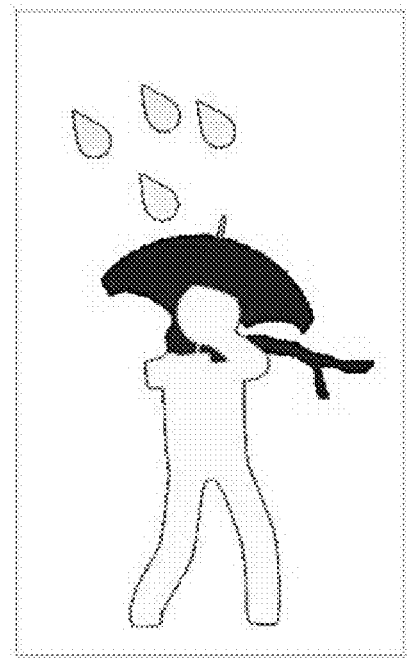

Referring to FIGS. 8A-8D, there is illustrated an animation sequence to convey what rainy, cool and windy feels like to a viewer. The sequence begins with an image of a person wearing a scarf that is blowing in the wind. The person is also beginning to deploy an umbrella (FIG. 8A). The sequence continues by showing the person deploying the umbrella into the wind (FIG. 8B). Next, the person is shown struggling to place the umbrella in an upright position (FIG. 8C). Finally, rain is shown falling on the umbrella and the scarf continues to blow (FIG. 8D). As such, the animation sequence of FIGS. 8A-8D illustrates that the viewer will feel cool in the elements and may have to fight the effects of wind when using an umbrella.

Figure 9A:
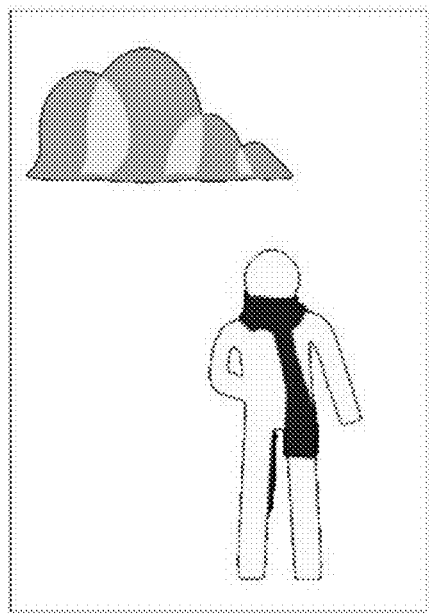
Figure 9B:
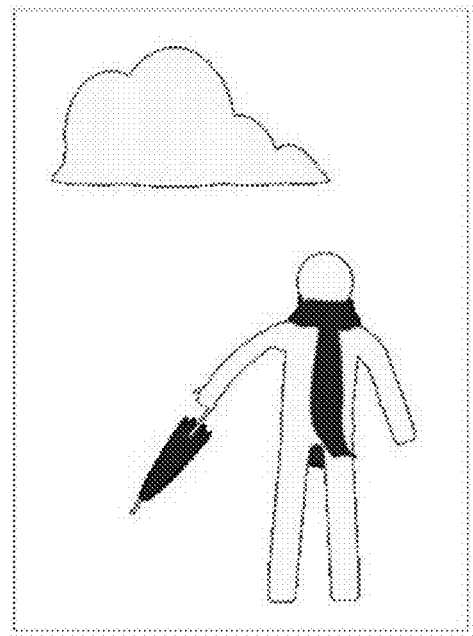
Figure 9C:
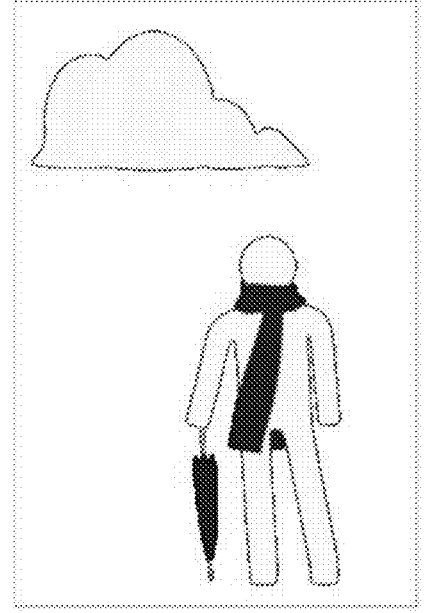
Figure 9D:
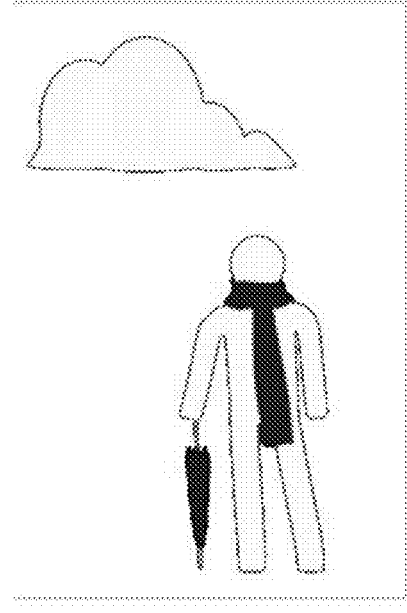

Referring to FIGS. 9A-9D, there is illustrated an animation sequence to convey what cloudy, cool and chance of rain feels like to a viewer. The sequence begins with an image of a person wearing a scarf and holding an umbrella in the background. The clouds are shown as grey (FIG. 9A). The sequence continues by showing the person moving the umbrella to the foreground. The clouds are shown having a lighter grey, but may remain darker, if desired (FIG. 9B). Next, the person is shown positioning the umbrella in the foreground (FIG. 9C). Finally, the person may move to a final stance where the scarf to moves from left to right (FIG. 9D). As such, the animation sequence of FIGS. 9A-9D illustrates that the viewer will feel cool in the elements and should take an umbrella due to the chance of rain.

Figure 10A:
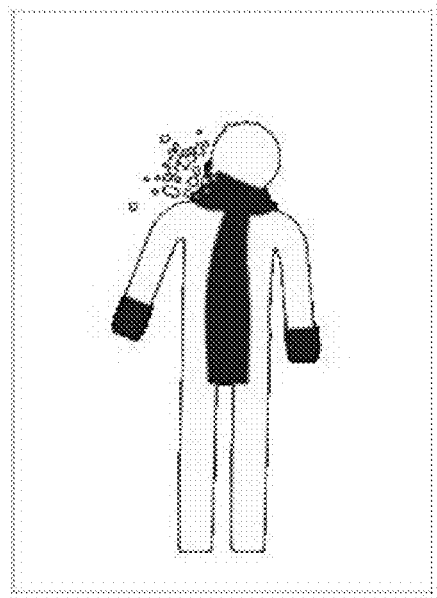
Figure 10B:
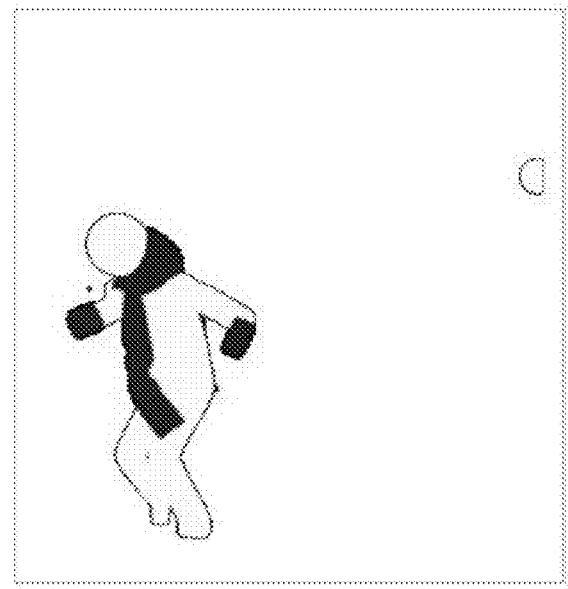
Figure 10C:
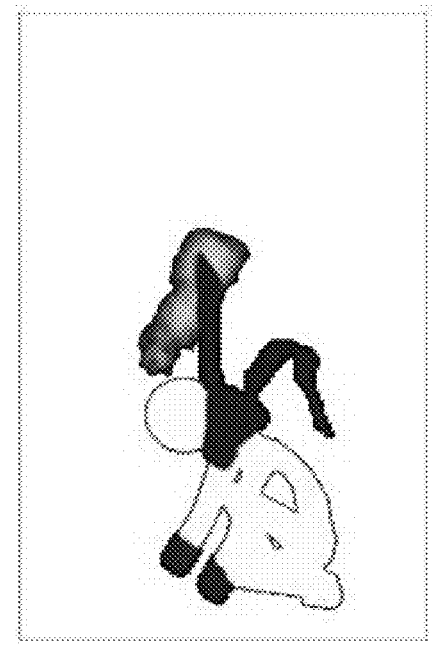
Figure 10D:
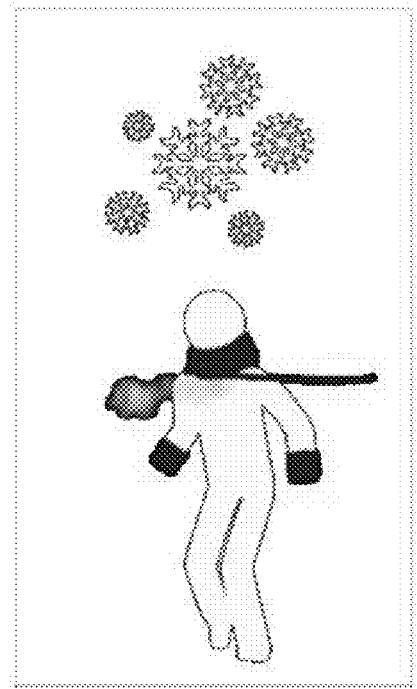

Referring to FIGS. 10A-10D, there is illustrated an animation sequence to convey what a snowy day may feel like to a viewer. The sequence begins with an image of a person having fun outside in a snowball fight. The person is wearing a scarf and is shown being hit by a snowball (FIG. 10A). The sequence continues by showing the person ducking to avoid another incoming snowball from the right (FIG. 10B). Next, the person is shown in a crouched position, avoiding the snowball. Fog is shown as the person exhales (FIG. 10C). Finally, snowflakes are shown falling on the person (FIG. 10D). As such, the animation sequence of FIGS. 10A-10D illustrates wintertime activity and that the viewer will feel cold.

Figure 11A:
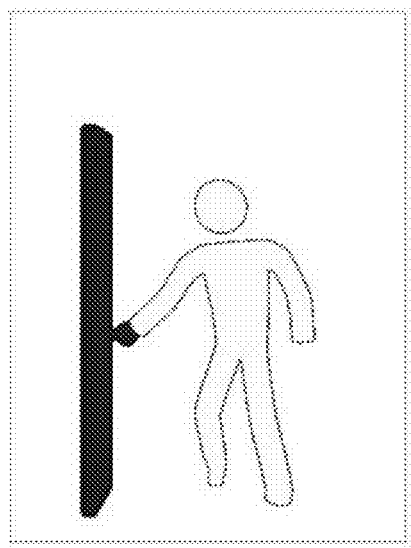
Figure 11B:
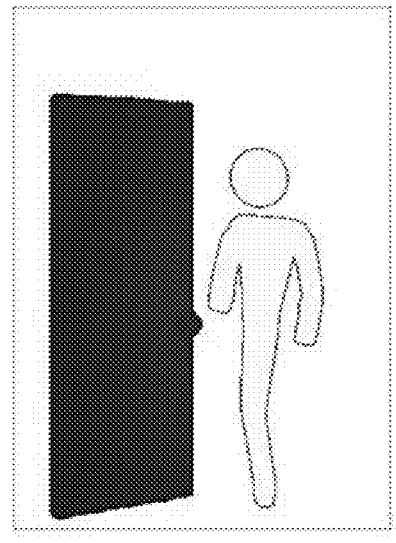
Figure 11C:
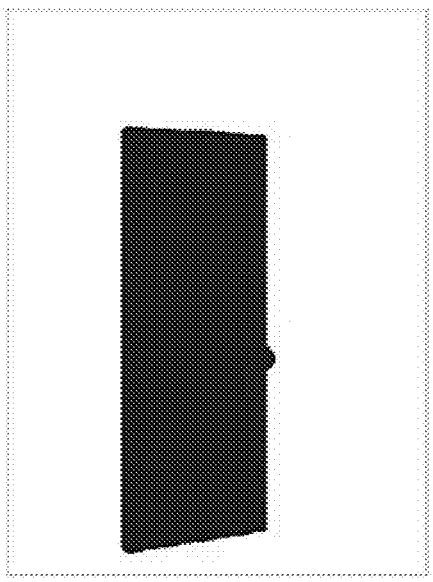
Figure 11D:
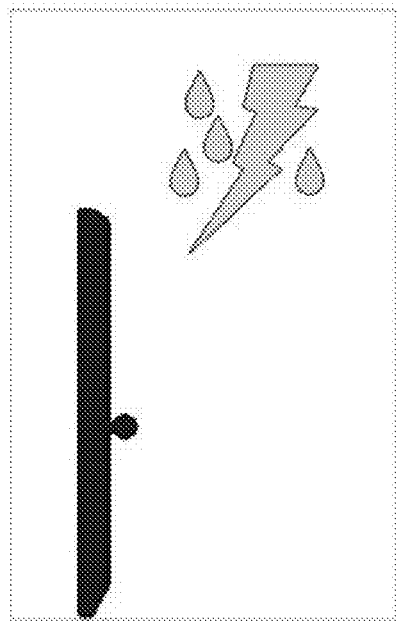

Referring to FIGS. 11A-11D, there is illustrated an animation sequence to convey what thunderstorms and mild feels like to a viewer. To convey the potential danger associated with thunderstorms, the sequence begins with an image of a person approaching a door to head indoors. The person is not shown with any wintery garments, such as a scarf to convey that the temperature is mild (FIG. 11A). The sequence continues by showing the person opening the door and heading inside (FIG. 11B). Next, the door is shown fully open after the person has gone inside (FIG. 11C). Finally, the door is shown closed and a flash of lighting and rain are shown (FIG. 11D). As such, the animation sequence of FIGS. 11A-11D illustrates the dangers of thunderstorms and the storm activity.

Figure 12A:
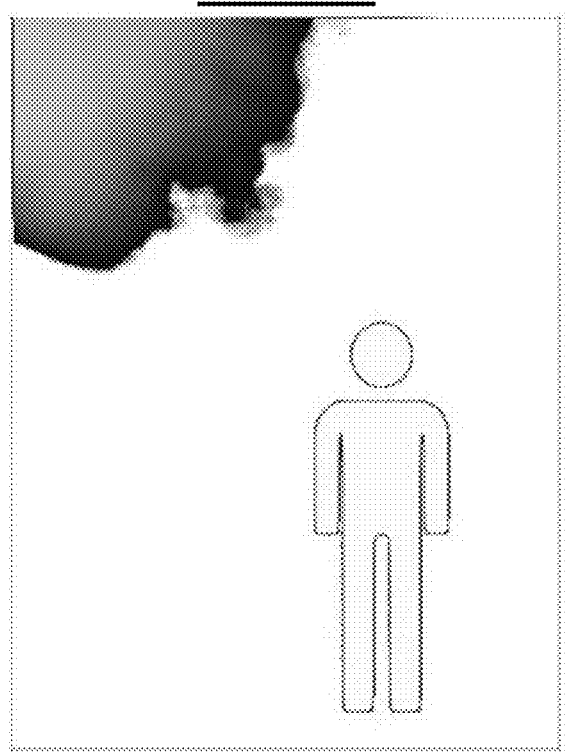
Figure 12B:
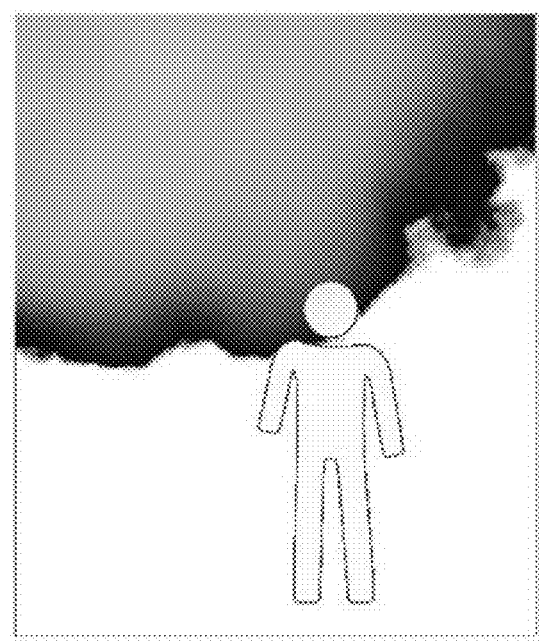

Referring to FIGS. 12A-12B, there is illustrated an animation sequence to convey what foggy conditions feel like to a viewer. The person is not shown with any wintery garments, such as a scarf to convey that the temperature is mild. The fog is shown in the upper left-hand corner (FIG. 12A). The sequence continues with the fog expanding from the upper left-hand corner to the lower right-hand corner (FIG. 12B). Eventually, the person may be obscured by the fog to show the potential dangers of foggy conditions. As such, the animation sequence of FIGS. 12A-12B illustrates the foggy conditions.

As would now be understood by one of ordinary skill in the art, animation sequences may be created in accordance with the present disclosure for any of the weather conditions noted in Table 1, or other combinations contemplated thereby. Further, the animation sequences may be tailored to specific locations, advertising campaigns, events, etc., as noted above. For example, the local football team logo may be used during the football season, advertiser logos may be used during adverting campaigns, holiday elements may be added, etc.

Figure 13:
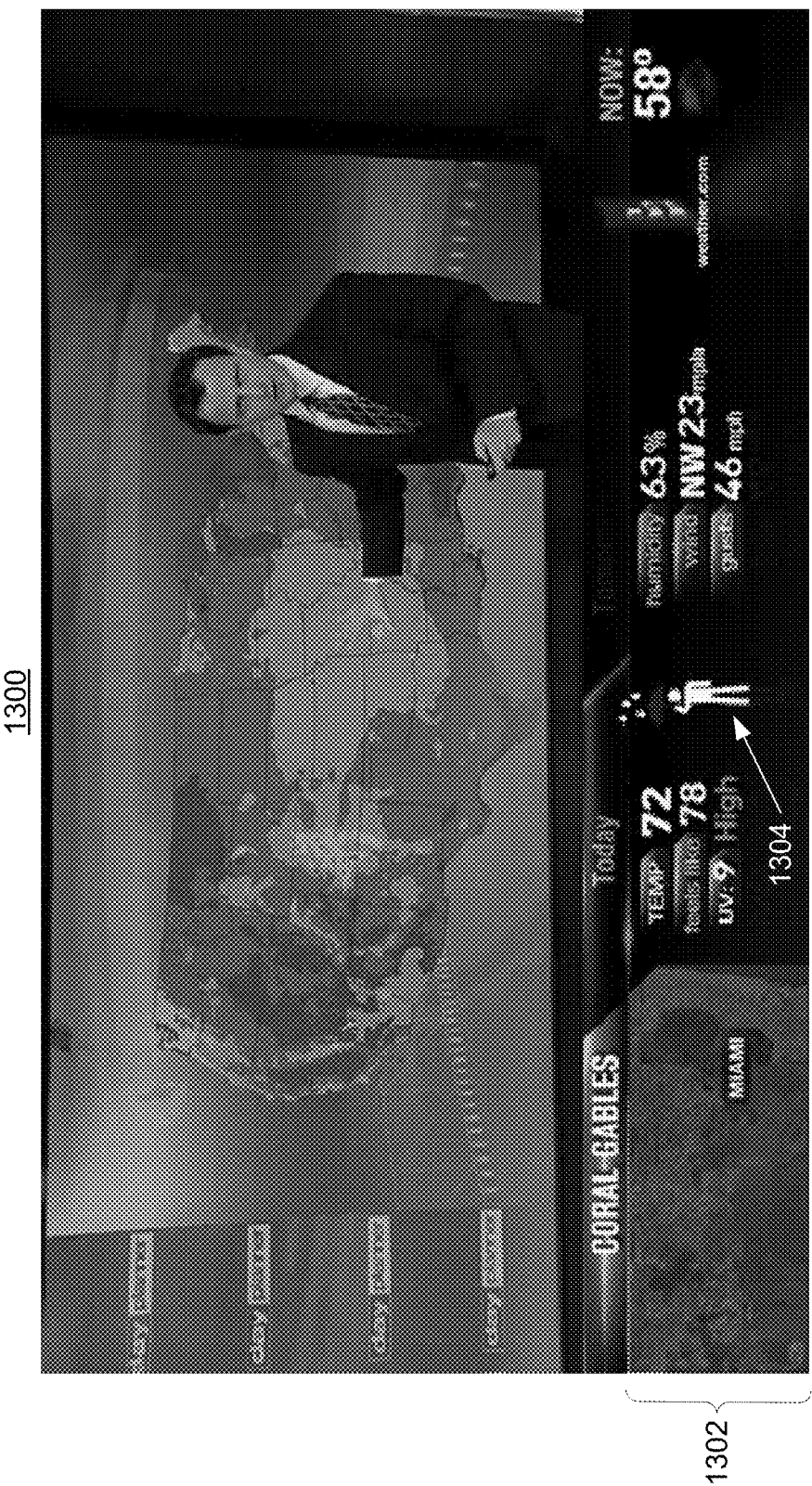
FIGS. 13-15 illustrate screen shots of example broadcast presentations where the animation sequence augments a broadcast presentation.
Figure 14:
Figure 15:
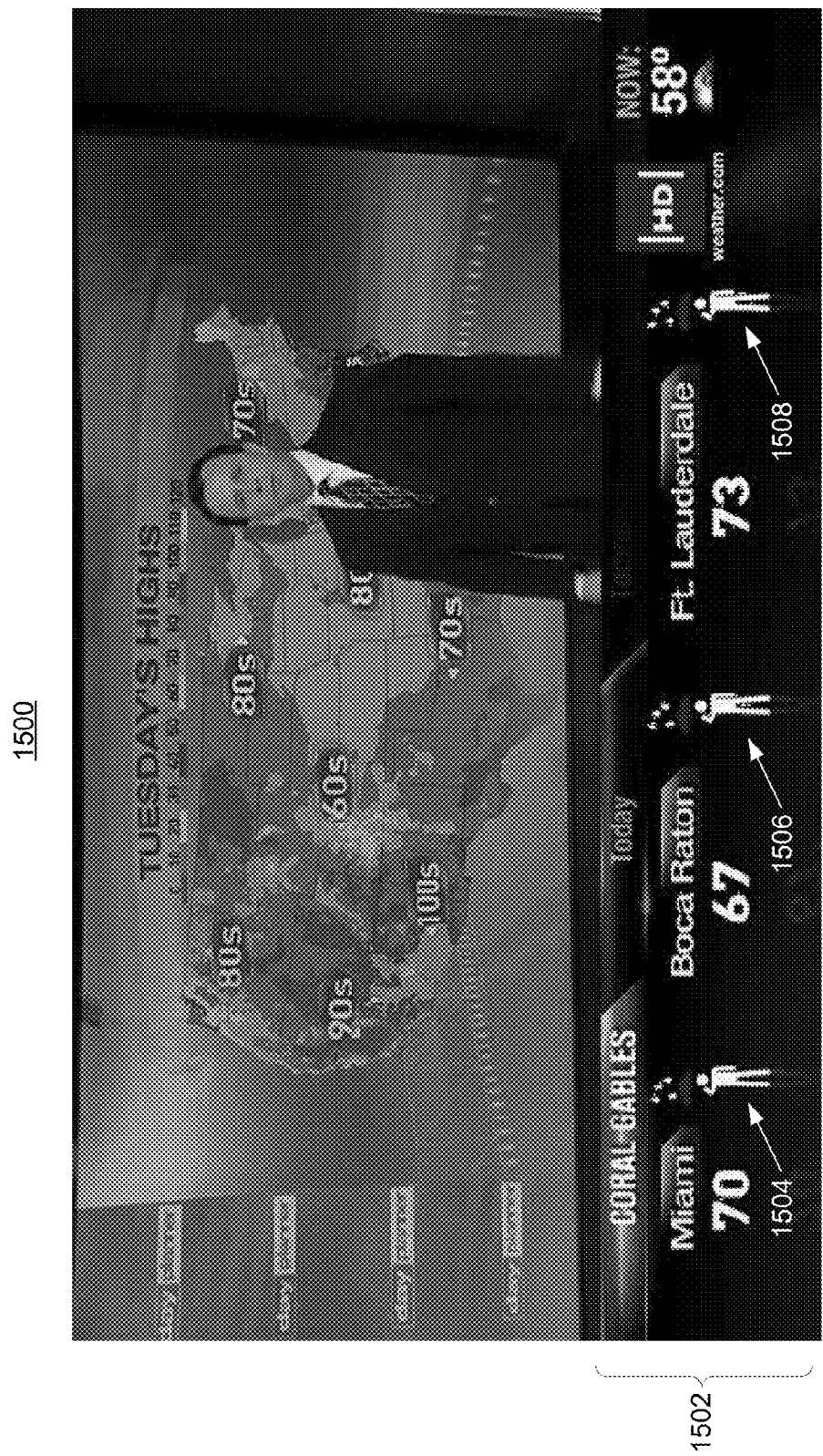

FIGS. 13-15 illustrate screen shots of example broadcast presentations where the animation sequence augments a broadcast presentation. In accordance with implementations herein, the broadcast presentation is national program (i.e., "Day Planner" distributed by The Weather Channel) having local content is superimposed thereon by the receiver.

Referring to FIG. 13, there is illustrated an example screen shoot 1300 of a national broadcast presentation having a local weather outlook 1302 presentation area. The animation sequence 1304 may be provided proximate to the daily weather forecast to provide an indication of how the forecasted weather will feel or affect to the viewer. In particular, in some implementations, the central system data casts a micro program message to the receiver units instructing the receiver units to provide the local weather outlook 1302. The micro program executes and instructs the personality modules via the event channels to provide the local weather outlook 1302.

The personality modules access the data store to obtain the local weather information and then provide the information and the local weather outlook presentation to the rendering engine. If the presentation for the local weather outlook is one that is used repeatedly by the receiver unit, then the presentation may be stored in a personality module. Alternatively, the presentation can be sent with the micro program. In accordance with the code associated with the micro program, the rendering engine renders the animation sequence 1304 on top of the local weather outlook by overlaying the animation sequences on the raw video frames. The A/V subsystem receives the rendered video frames from the rendering engine and outputs the video frames so that the local weather outlook is presented to the end viewer.

Referring to FIG. 14, there is illustrated an example screen shoot 1400 of a national broadcast presentation having an hourly local weather outlook 1402 presentation area. Animation sequences 1404-1412 may be provided proximate to the weather forecast for each time indicated to provide an indication of how the forecasted weather will feel or affect to the viewer at that particular time in a multi-hourly forecast. The process of presenting the animation sequences 1404-1412 may be performed as noted above with regard to FIG. 13.

Referring to FIG. 15, there is illustrated an example screen shoot 1500 of a national broadcast presentation having a multiple city local weather outlook 1502 presentation area. Animation sequences 1504-1508 may be provided proximate to the weather forecast for each city to provide an indication of how the forecasted weather will feel or affect to the viewer in the particular city. The process of presenting the animation sequences 1504-1508 may be performed as noted above with regard to FIG. 13.

As would now be recognized by one of ordinary skill in the art, any programming feed may be augmented by including the animation sequences. For example, marine forecasts, hourly forecasts, alerts, etc., may include the animation sequences. In addition, the animation sequence may be added to content provided over the Internet to general purpose computing devices, over wireless networks to mobile devices, as a still image captured from the animation sequence, etc., in a format compatible with such end devices.

Figure 16:
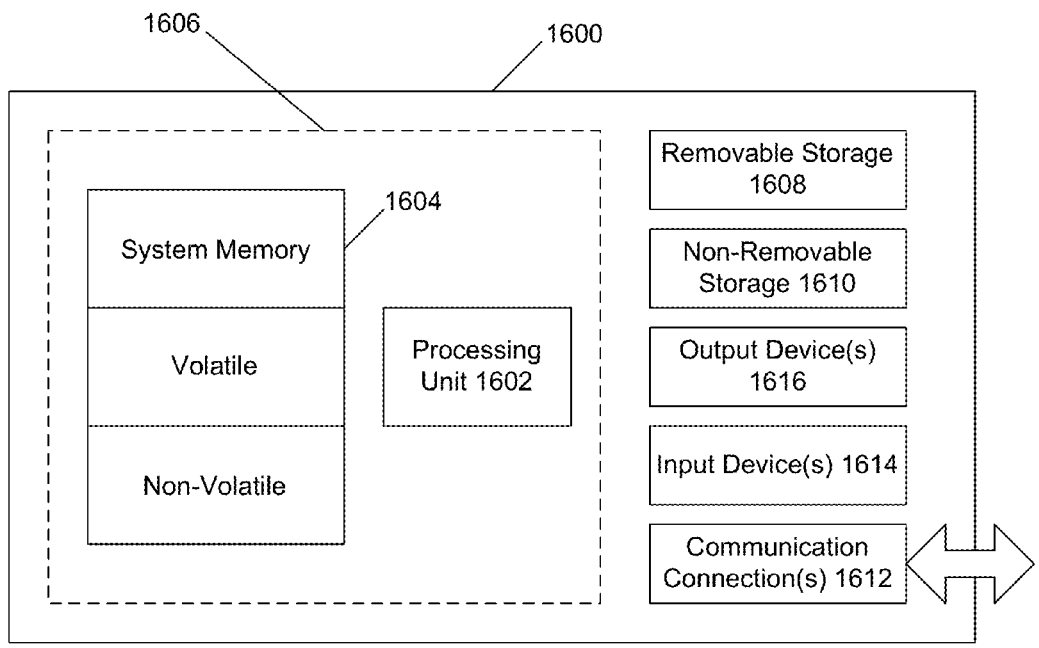
FIG. 16 illustrates an exemplary computing environment in which aspects of the disclosure may be implemented

FIG. 16 illustrates an exemplary computing environment in which aspects of the disclosure may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules being executed by a computer, may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 16, an exemplary system for implementing aspects described herein includes a computing device, such as computing device 1600. In its most basic configuration, computing device 1600 typically includes at least one processing unit 1602 and system memory 1604. Depending on the exact configuration and type of computing device, system memory 1604 may be volatile (such as random access memory (RAM)), non-volatile (such as read-only memory (ROM), flash memory, etc.), or some combination of the two. This most basic configuration is illustrated in FIG. 16 by dashed line 1606.

Computing device 1600 may have additional features and/or functionality. For example, computing device 1600 may include additional storage (removable and/or non-removable) including, but not limited to, magnetic or optical disks or tape. Such additional storage is illustrated in FIG. 16 by removable storage 1608 and non-removable storage 1610.

Computing device 1600 typically includes a variety of computer-readable media. Computer-readable media can be any available media that can be accessed by computing device 1600 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 1604, removable storage 1608, and non-removable storage 1610 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1600. Any such computer storage media may be part of computing device 1600.

Computing device 1600 may also contain communication connection(s) 1612 that allow the computing device 1600 to communicate with other devices. Communication connection(s) 1612 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 1600 may also have input device(s) 1614 such as a keyboard, mouse, pen, voice input device, touch input device, etc. Output device(s) 1616 such as a display, speakers, printer, etc. may also be included. All these devices are well known in the art and need not be discussed at length here.

Computing device 1600 may be one of a plurality of computing devices 1600 inter-connected by a network. As may be appreciated, the network may be any appropriate network, each computing device 1600 may be connected thereto by way of communication connection(s) 1612 in any appropriate manner, and each computing device 1600 may communicate with one or more of the other computing devices 1600 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for providing an animation sequence representative of local weather conditions, comprising:
   receiving a national program from a central system at a receiver unit as part of a data-cast;
   extracting information from the national program, the information containing a code based on the local weather conditions, wherein the code is determined as a function of weights applied to respective weather conditions based on a statistical relevance of indicators associated with the respective weather conditions;
   comparing the information to an identifier of the receiver unit to determine that the information pertains to the receiver unit, and in response to the determination,
   retrieving animation graphics from a library of animation graphics, the animation graphics selected based on the code;
   building an animation sequence from the animation graphics; and
   outputting the animation sequence for display at a display device, wherein the animation sequence illustrates how the local weather conditions affect a viewer, the animation sequence comprising a dynamic representation of at least one of the local weather conditions acting on an object.

2. The method of claim 1, further comprising:
   receiving the indicators in the national program at the receiver unit in place of the code; and
   modeling the indicators at the receiver unit to determine the code.

3. The method of claim 1, further comprising generating the animation sequence in one of a local forecast, 10-day forecast, hourly forecast, weather alert, marine forecast and multi-hour forecast.

4. The method of claim 1, further comprising:
   determining if an override value is specified at the receiver unit; and
   accessing the library in accordance with the override value to retrieve second animation graphics.

5. The method of claim 1, further comprising:
   providing the animation graphics as reusable elements in the library; and
   scripting the reusable elements in a sequence to create the animation sequence.

6. The method of claim 1, further comprising superimposing the animation sequence on the national program to display both the national program and the local condition.

7. The method of claim 1, further comprising providing the animation sequence during periods of only local programming.

8. The method of claim 1, further comprising updating the animation graphics through the data-cast from the central system.

9. The method of claim 1, further comprising providing the animation sequence to one of a television display, an application running on a mobile device, and an application running on a general purpose computing device.

10. The method of claim 1, wherein the receiver unit is located at a cable headend, the method further comprising providing the animation sequence from the headend to a set-top device to be displayed on the display device.

11. A method for producing an animation representative of local weather conditions, comprising:
    receiving a data-cast from a central system at a receiver system, the data-cast including national content and information regarding the local weather conditions;

extracting the information regarding the local weather conditions from the data-cast, the information containing a code based on the local weather conditions, wherein the code is determined based on weights applied to respective weather conditions associated with the local weather conditions based on a statistical relevance of indicators associated with the respective weather conditions;

comparing the information to a receiver system configuration parameter to determine that the information is relevant to the receiver system, and in response to the determination:

sequencing animation graphics selected in accordance with the code to produce the animation; and outputting the animation as part of a multimedia presentation that includes the national content and the local weather conditions, wherein the animation illustrates how the local weather conditions affect a viewer, the animation comprising a dynamic representation of at least one of the local weather conditions acting on an object.

12. The method of claim 11, further comprising retrieving animation graphics from a library of animation graphics in accordance with the code.

13. The method of claim 12, further comprising:

providing the animation graphics as reusable elements in a data store in the receiver system; and sequencing the animation graphics in accordance with a script to create the animation.

14. The method of claim 13, further comprising updating the animation graphics using a file transfer mechanism of the data-cast.

15. The method of claim 14, further comprising wherein the multimedia presentation includes one of a local forecast, 10-day forecast, hourly forecast, weather alert, marine forecast and multi-hour forecast sequenced with the national content in accordance with a playlist.

16. A non-transitory computer readable medium containing computer-executable instructions that when executed by a computing device perform the method, comprising:

receiving a data-cast from a central system at a receiver unit;

extracting information from the data-cast that includes a code based on local weather conditions, wherein the code is determined based on weights applied to respective weather conditions associated with the local weather conditions based on a statistical relevance of indicators associated with the respective weather conditions;

comparing the information to a receiver unit parameter to determine if the local weather conditions are relevant to the receiver unit, and if so, building an animation from graphical elements stored in the receiver unit to represent the condition; and outputting the animation as part of a media presentation for display at a display device, wherein the animation illustrates how the local weather conditions affect a viewer, the animation comprising a dynamic representation of at least one of the local weather conditions acting on an object.

17. The non-transitory computer readable medium of claim 16, further comprising instructions for:

receiving national content in the data-cast; and providing the animation with information regarding the region to which the local weather conditions pertain together with the national content.

18. The non-transitory computer readable medium of claim 16, further comprising instructions for:

determining if an override value is specified at the receiver unit;

determining alternate graphical elements in accordance with the override; and building the animation including the alternate graphical elements.

\* \* \* \* \*